(12) United States Patent
Yamaguchi et al.

(10) Patent No.: US 12,360,645 B2
(45) Date of Patent: Jul. 15, 2025

(54) TOUCH SENSOR

(71) Applicant: Panasonic Intellectual Property Management Co., Ltd., Kadoma (JP)

(72) Inventors: Ryo Yamaguchi, Osaka Fu (JP); Yuji Nonami, Okayama Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/561,140

(22) PCT Filed: Feb. 18, 2022

(86) PCT No.: PCT/JP2022/006748
§ 371 (c)(1),
(2) Date: Nov. 15, 2023

(87) PCT Pub. No.: WO2022/244355
PCT Pub. Date: Nov. 24, 2022

(65) Prior Publication Data
US 2024/0256096 A1   Aug. 1, 2024

(30) Foreign Application Priority Data

May 19, 2021 (JP) ................................. 2021-084574

(51) Int. Cl.
G06F 3/044 (2006.01)
G06F 3/047 (2006.01)

(52) U.S. Cl.
CPC ............ G06F 3/0448 (2019.05); G06F 3/047 (2013.01); *G06F 2203/04112* (2013.01)

(58) Field of Classification Search
CPC .................. G06F 3/0448; G06F 3/047; G06F 2203/04112; G06F 3/0445; G06F 3/0446; G06F 3/041; G06F 3/044
See application file for complete search history.

(56) References Cited

U.S. PATENT DOCUMENTS

| | | | |
|---|---|---|---|
| 2016/0224181 A1 | 8/2016 | Kim et al. | |
| 2016/0274703 A1* | 9/2016 | Satou | G06F 3/0445 |
| 2018/0348497 A1* | 12/2018 | Sakamoto | G02B 21/26 |
| 2019/0255818 A1* | 8/2019 | Ueki | G09F 9/00 |

(Continued)

FOREIGN PATENT DOCUMENTS

| | | |
|---|---|---|
| CN | 113093954 A | 7/2021 |
| JP | 2016-530649 A | 9/2016 |

(Continued)

OTHER PUBLICATIONS

International Search Report dated May 24, 2022, issued in counterpart International Application No. PCT/JP2022/006748 (5 pages).

*Primary Examiner* — Grant Sitta
(74) *Attorney, Agent, or Firm* — WHDA, LLP (57) ABSTRACT

A first mesh pattern (13) of a touch sensor (1) includes first cells (15) in a diamond shape with an acute angle (A1). A second mesh pattern (16) of the touch sensor (1) includes second cells (18) in a square shape. The acute angle (A1) ranges from 50° to 65°. One of second thin wires (17) of each second cell (18) and the longer diagonal line 15a of associated one of the first cells (15) form an angle A2 ranging from 15° to 75° in a plan view.

15 Claims, 11 Drawing Sheets

(56) References Cited

U.S. PATENT DOCUMENTS

2020/0142541 A1* 5/2020 Miura .................. G06F 3/0445
2020/0142542 A1* 5/2020 Kuriki .................. G06F 3/0445

FOREIGN PATENT DOCUMENTS

| JP | 2017-182213 A | 10/2017 |
| JP | 2018-180741 A | 11/2018 |
| JP | 2020-021184 A | 2/2020 |

* cited by examiner

TOUCH SENSOR

CROSS REFERENCE TO RELATED APPLICATIONS

This Application is the National Stage of International Application No. PCT/JP2022/006748, filed on Feb. 18, 2022, which claims priority from Application No. 2021-084574 filed on May 19, 2021 in Japan. The entire contents of these applications are incorporated herein by reference in their entirety.

TECHNICAL FIELD

The present disclosure relates to a touch sensor.

BACKGROUND ART

A touch sensor allowing a touch operation as illustrated in Patent Document 1, for example, is typically known.

Patent Document 1 discloses a touch sensor including: a transparent substrate; a sensor electrode on the transparent substrate and substantially in a band shape; and a wire with one end electrically connected to the sensor electrode for electrically connecting the sensor electrode to an external circuit. The sensor electrode has a mesh pattern obtained by arranging, in the form of a mesh, a plurality of thin wires made of a conductive metal.

CITATION LIST

Patent Document

Patent Document 1: Japanese Unexamined Patent Publication No. 2020-21184

SUMMARY OF THE INVENTION

Technical Problems

The touch sensor according to Patent Document 1 includes the sensor electrode with a transmission electrode and a reception electrode. The transmission electrode and the reception electrode have the same mesh pattern. If the transmission electrode and the reception electrode have the same mesh pattern, moiréoccurs and impairs the visibility. If the pitch of the thin wires is changed to reduce the moiré, the touch accuracy varies due to a capacitance change.

At a pitch set to a certain value or more, the thin wires appear remarkably, which degrades the overall appearance. At a pitch set to a certain value or less, the thin wires are less visible due to the moiré with a display and have a larger number of intersections, which increases the capacitance and thus impairs the touch accuracy.

The present disclosure was made in view of the problems. It is an objective of the present disclosure to reduce moiré and the appearance of wires and reduce a decrease in the touch accuracy.

Solution to the Problem

In order to achieve the above objective, a touch sensor according to an embodiment of the present disclosure includes: a first electrode in a first mesh pattern obtained by intersecting a plurality of first thin wires with a conductivity; and a second electrode in a second mesh pattern obtained by intersecting a plurality of second thin wires with a conductivity. The first mesh pattern is formed by first cells in a diamond shape with an acute angle. The second mesh pattern is formed by second cells in a square shape. The acute angle ranges from 50° to 65°. One side of each of the second cells and a diagonal line of associated one of the first cells form an angle ranging from 15° to 75° in a plan view.

Advantages of the Invention

The present disclosure can reduce moiré and the appearance of wires and reduce a decrease in the touch accuracy.

DESCRIPTION OF EMBODIMENTS

Embodiments of the present disclosure will now be described in detail with reference to the drawings. Note that the following description of the embodiment is merely an example in nature, and is not intended to limit the scope, applications, or use of the present disclosure.

First Embodiment

Figure 1:
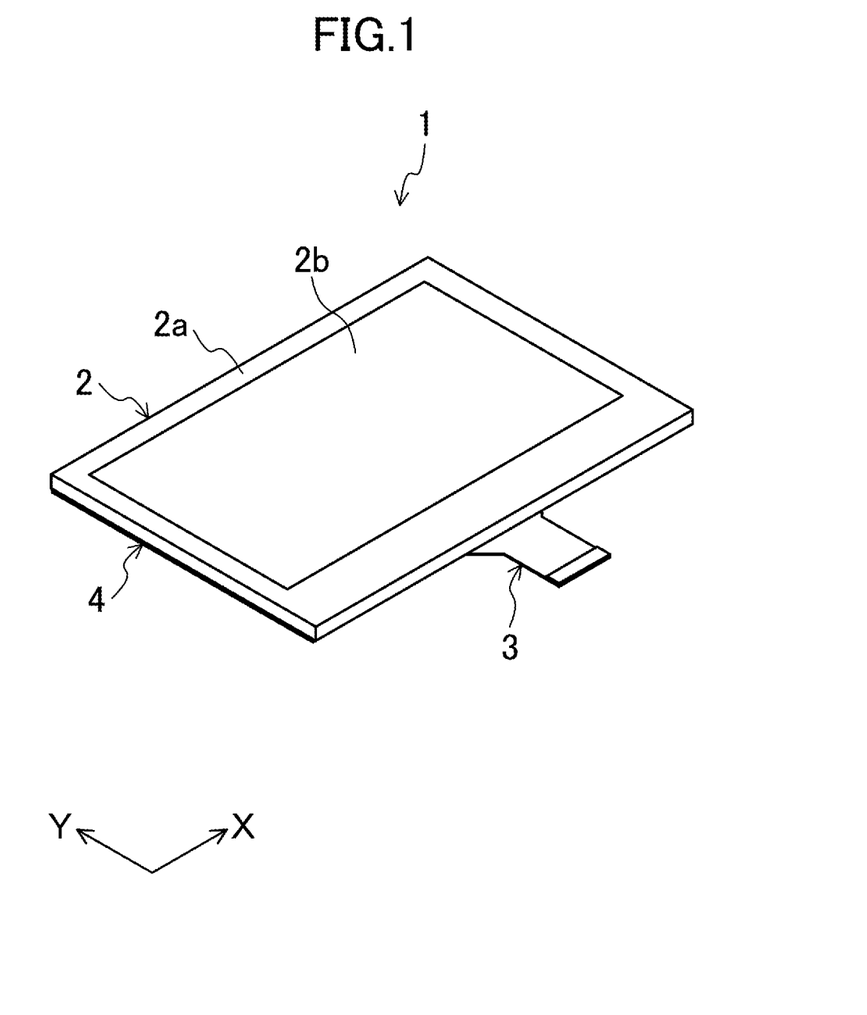
FIG. 1 is an overall perspective view of a touch sensor according to a first embodiment of the present disclosure.

FIG. 1 is an overall view of a touch sensor 1 according to a first embodiment of the present disclosure. The touch sensor 1 is a sensor input device allowing a touch operation. The touch sensor 1 is used as an input device for various devices (e.g., an on-vehicle device, such as a car navigation system, a display device of a personal computer, a mobile phone, a portable information terminal, a portable game machine, a copier, a ticket-vending machine, an automated teller machine, or a clock) with a display device, such as a liquid crystal display or an organic EL display, incorporated therein.

In the following description, the long sides of the touch sensor 1 (from the bottom left to the top right in FIG. 1) extends along the X-axis, while the short sides of the touch sensor 1 (from the bottom right to the top left in FIG. 1) extend along the Y-axis orthogonal to the X-axis. In addition, the vertical direction of the touch sensor 1 is defined as follows. An operation screen 2b of a cover member 2, which will be described later, is located on the "upper" side and the side opposite to the operation screen 2b is the "lower" side. Note that such a positional relationship is irrelevant to the actual directions in the touch sensor 1 or a device with the touch sensor 1 incorporated therein.

(Cover Member)

As illustrated in FIG. 1, the touch sensor 1 includes the light-transmissive cover member 2. The cover member 2 is a cover glass, or a cover lens made of plastic. The cover member 2 is in the shape of a rectangular plate, for example. The cover member 2 is stacked on the upper surface of a second substrate 6 which will be described later.

Formed along the periphery of the cover member 2 is a window frame 2a substantially in a frame shape colored in a dark color, such as black, by printing or any other suitable means. The inside rectangular area surrounded by the window frame 2a serves as a light-transmissive view area V (see FIG. 2). That is, through the view area V, the user can obtain visual information from the display behind the touch sensor 1. The upper surface of the cover member 2 corresponding to the view area V serves as the operation screen 2b touched by a user's finger, for example, in a touch operation.

(Flexible Wiring Board)

The touch sensor 1 includes a flexible wiring board 3. The flexible wiring board 3 has flexibility and electrical characteristics that are unchanged even in a state of deformation. The flexible wiring board 3 is made of a flexible insulating film made of polyimide (PI), polyethylene terephthalate (PET), or polyethylene naphthalate (PEN), for example. The flexible wiring board 3 has an end fixed to the upper surfaces of a first substrate 5 and the second substrate 6, which will be described later, with an anisotropic conductive adhesive (not shown), for example.

(Substrate)

Figure 2:
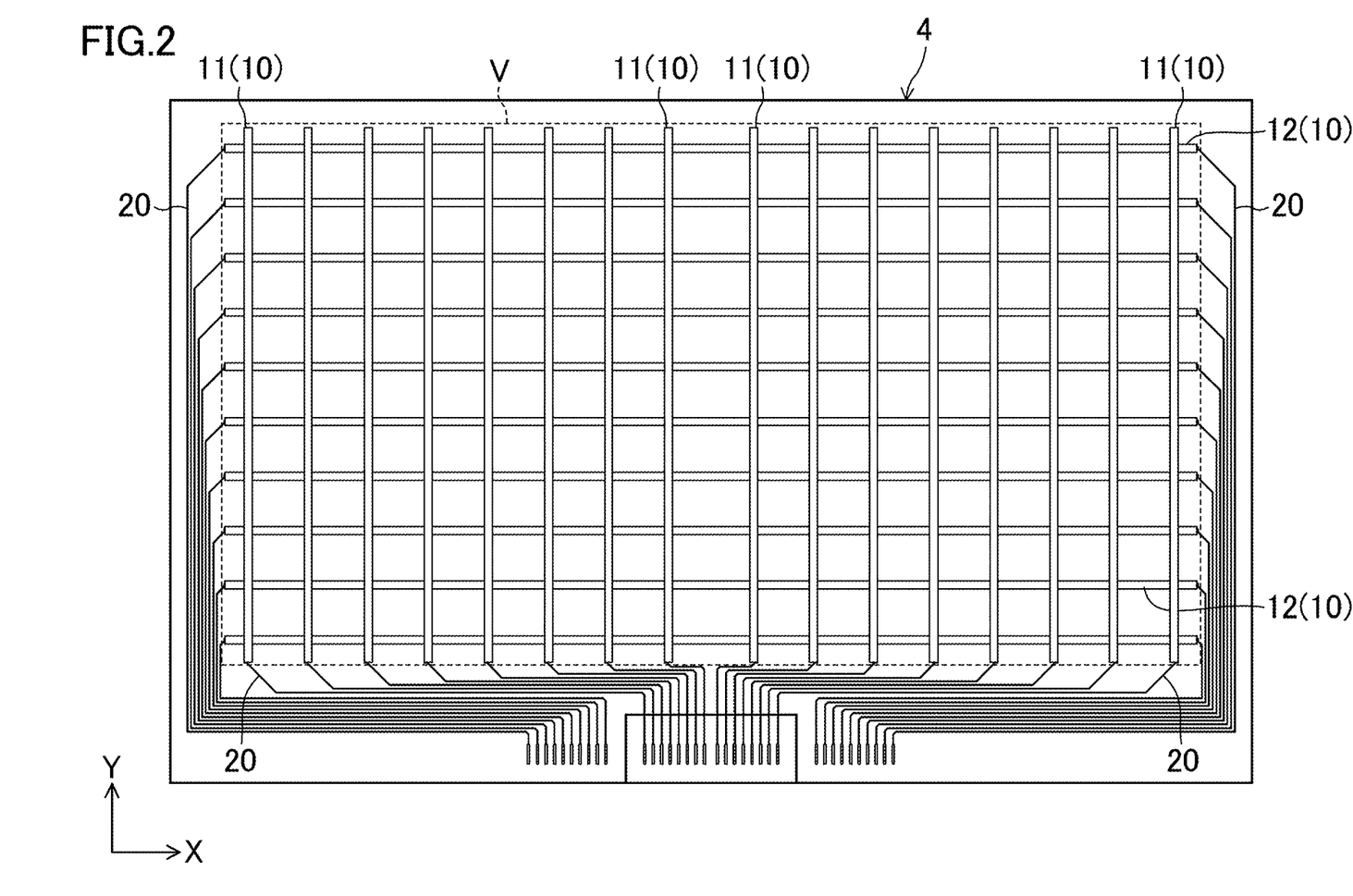
FIG. 2 is a plan view schematically showing an overlap between first and second substrates.
Figure 3:
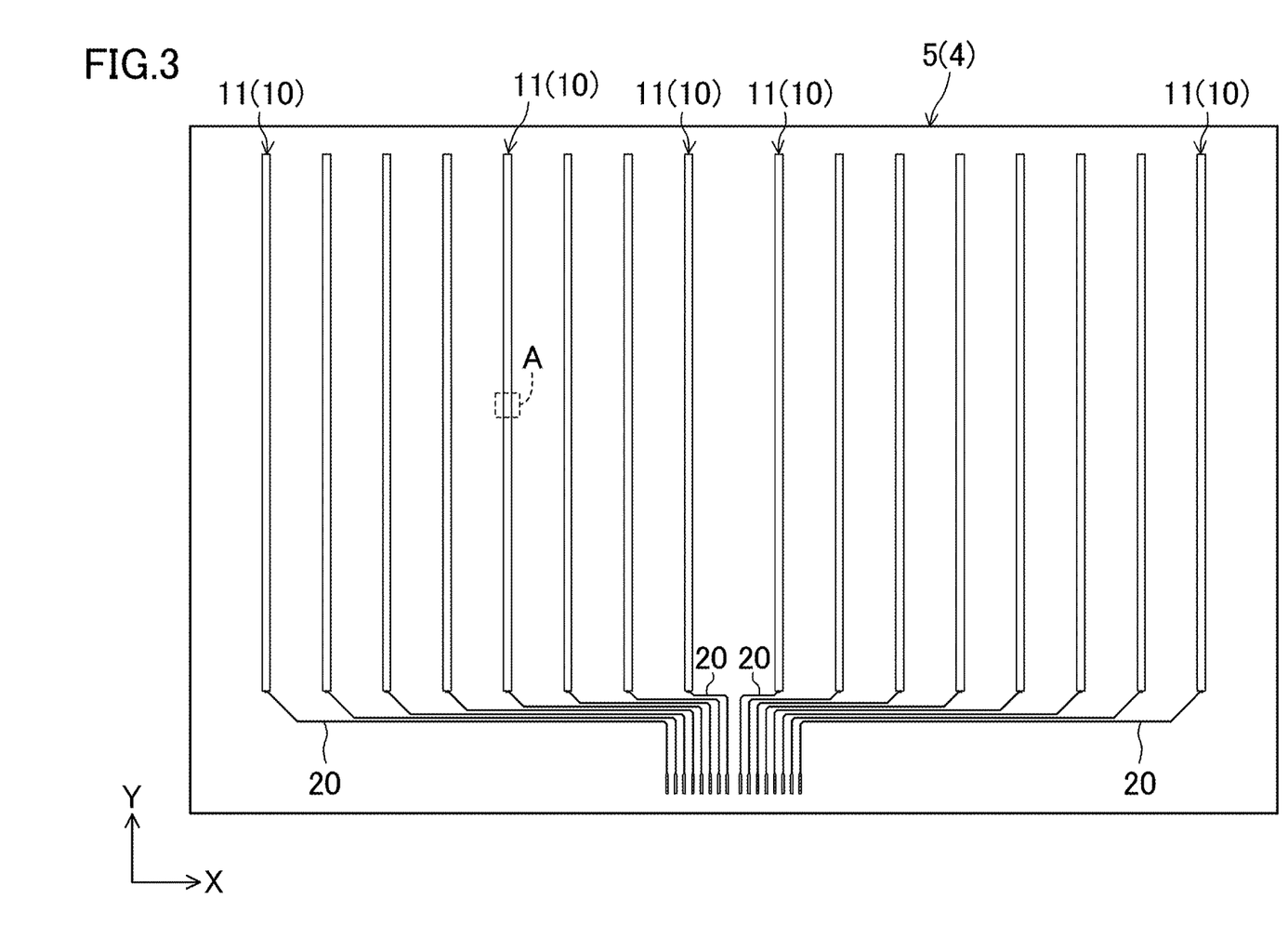
FIG. 3 is a plan view showing a configuration of the first substrate.
Figure 4:
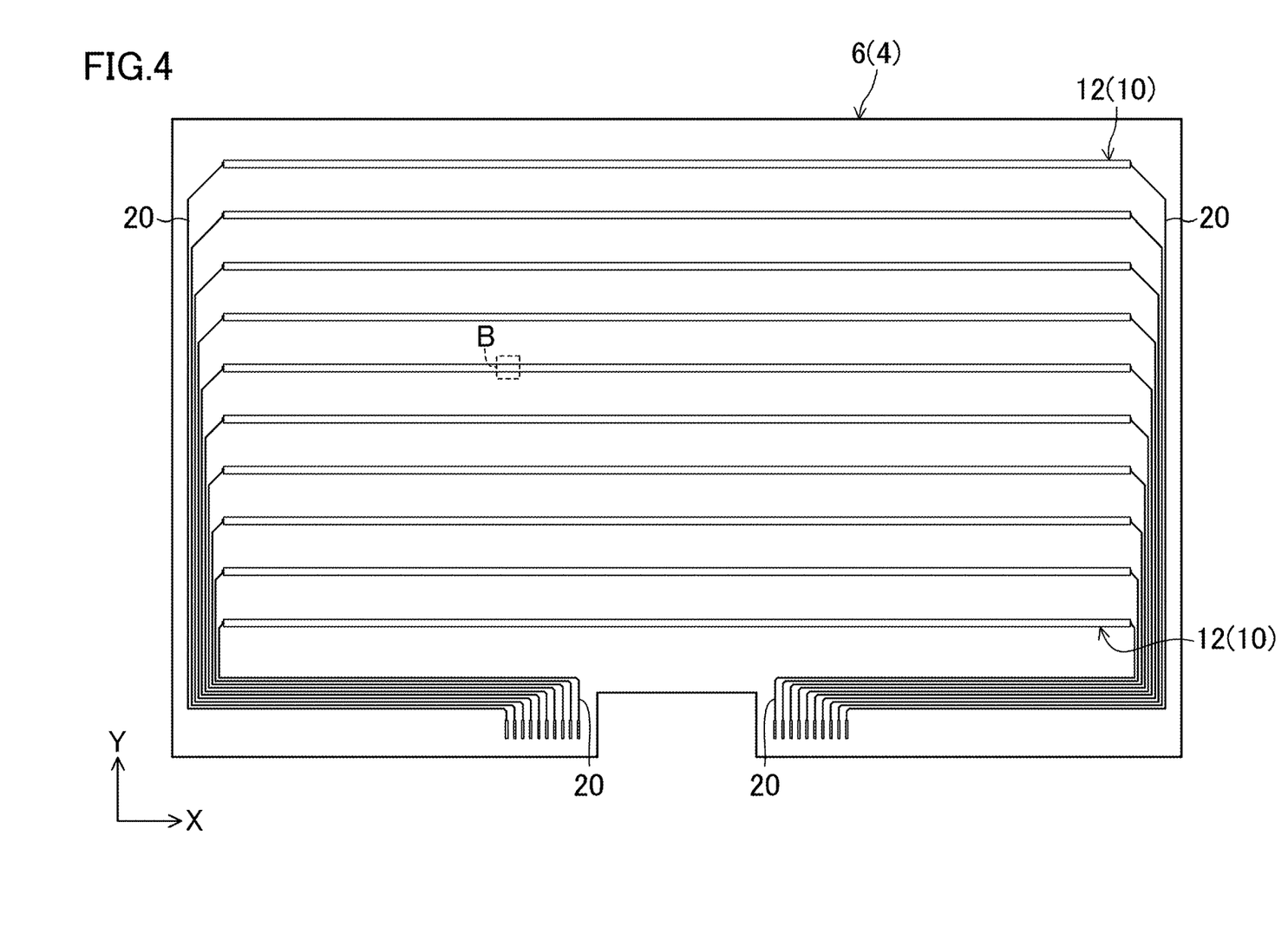
FIG. 4 is a plan view showing a configuration of the second substrate.

As illustrated in FIGS. 2 to 4, the touch sensor 1 includes substrates 4 and 4. The substrates 4 and 4 are, namely, the first substrate 5 and the second substrate 6. The first substrate 5 is stacked on the top of the second substrate 6 via a light-transmissive adhesive layer (not shown).

The first and second substrates 5 and 6 are each made of glass or a light-transmissive resin material, such as polycarbonate, polyethylene terephthalate, polyethersulfone, PMMA (acrylic), polyarylate, cyclic olefin polymer (COP), or cyclic olefin copolymer (COC).

The first and second substrates 5 and 6 are each substantially in a rectangular shape. The first substrate 5 has a lower surface with a liquid crystal display (not shown). If the second substrate 6 is made of a relatively hard material, no cover member 2 may be provided. In this case, the second substrate 6 may have the window frame 2a substantially in a frame shape, which serves as the view area V.

(Wires)

As illustrated in FIGS. 2 to 4, the touch sensor 1 includes wires 20, 20, . . . for electrically connecting sensor electrodes 10, 10, . . . to an external circuit (not shown). The wires 20, 20, . . . are located outside the view area V (see FIG. 2).

As illustrated in FIG. 3, each wire 20 on the upper surface of the first substrate 5 has one end electrically connected to one of transmission electrodes 11. This wire 20 has the other end electrically connected to the flexible wiring board 3.

As illustrated in FIG. 4, each wire 20 on the upper surface of the second substrate 6 has one end electrically connected to one of reception electrodes 12. This wire 20 has the other end electrically connected to the flexible wiring board 3.

(Sensor Electrode)

As illustrated in FIGS. 2 to 4, the touch sensor 1 includes the sensor electrodes 10, 10, . . . . The sensor electrodes 10, 10, . . . are located inside the view area V. The touch sensor 1 can detect a touch operation by a user's finger (i.e., a detection target) that have touched the operation screen 2b, through the sensor electrodes 10, 10, . . . . Specifically, the touch sensor 1 includes capacitive sensor electrodes 10, 10, . . . which include the transmission electrodes (first electrodes) 11, 11, . . . and the reception electrodes (second electrodes) 12, 12, . . . .

The transmission electrodes 11, 11, . . . are connected to a drive circuit (not shown). The transmission electrodes 11, 11, . . . emit an electric field to the surroundings using the drive circuit. As illustrated in FIG. 3, the transmission electrodes 11, 11, . . . are formed on the upper surface of the first substrate 5. Each transmission electrode 11 has long sides extending substantially in a band shape along the Y-axis in a plan view. The transmission electrodes 11, 11, . . . are aligned at intervals along the X-axis.

The reception electrodes 12, 12, . . . receive the electric field emitted from the transmission electrodes 11, 11, . . . . As illustrated in FIG. 4, the reception electrodes 12, 12, . . . are formed on the upper surface of the second substrate 6. Each reception electrode 12 has long sides extending substantially in a band shape along the X-axis in a plan view. The reception electrodes 12, 12, . . . are aligned at intervals along the Y-axis. The reception electrodes 12 are aligned to be substantially orthogonal to the transmission electrodes 11 at intervals in the vertical direction (see FIG. 2). That is, while being insulated from the transmission electrodes 11, the reception electrodes 12 intersects with the transmission electrodes 11.

Figure 5:
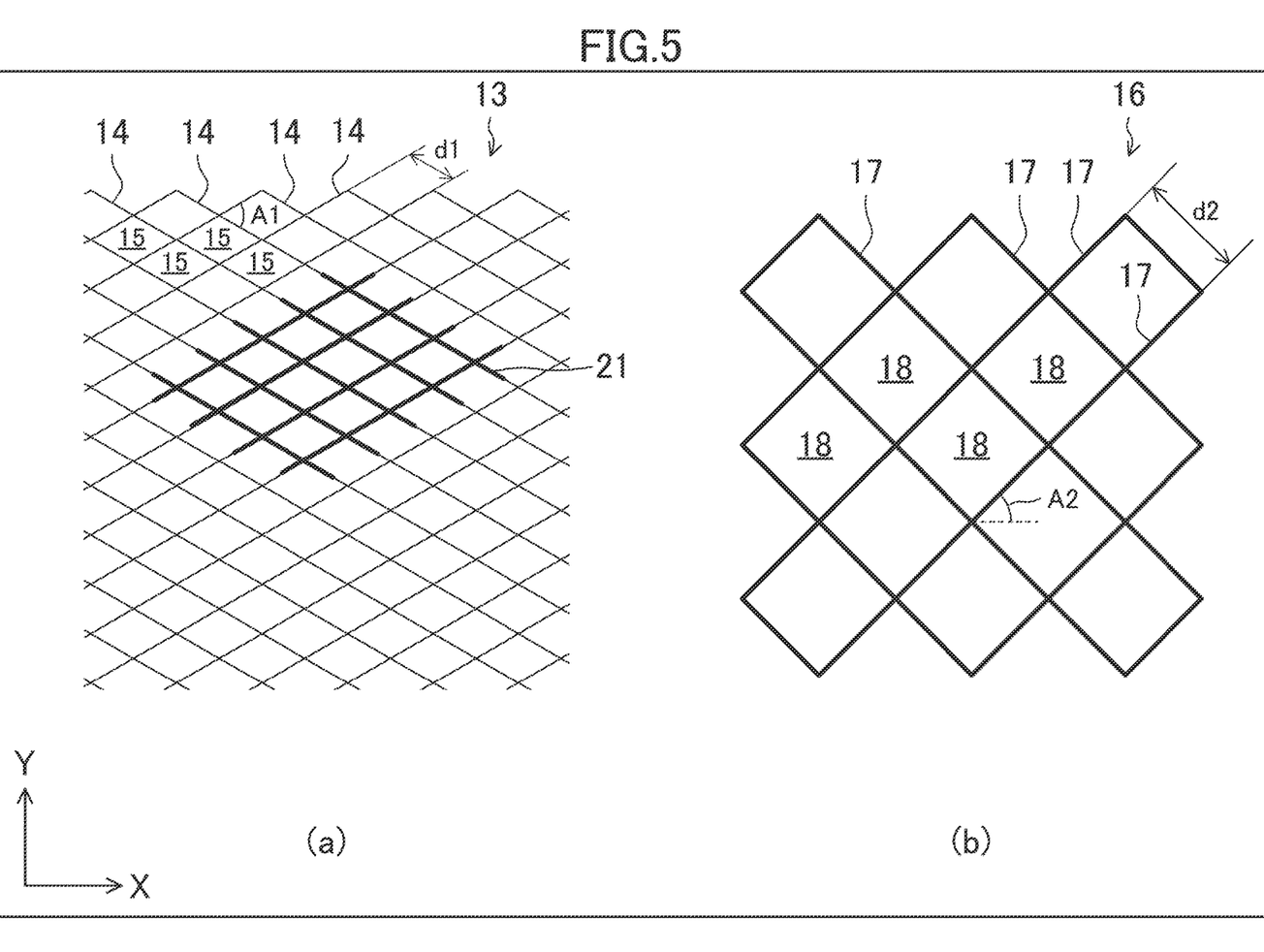
FIG. 5 includes partial enlarged views of FIGS. 3 and 4 and shows an illustration (a) that is an enlarged view of a part A in FIG. 3 and an illustration (b) that is an enlarged view of a part B in FIG. 4.

As illustrated in the illustration (a) of FIG. 5, each transmission electrode 11 has a first mesh pattern 13. The first mesh pattern 13 is in the shape of a mesh obtained by intersecting and arranging, at equal intervals, first thin wires 14, 14, . . . with a conductivity.

Each first thin wire 14 is a conductive layer obtained by embedding a conductive metal, such as copper or silver, in a groove in the upper surface of the substrate 4. Each first thin wire 14 has a width of 2 μm or less, for example, in one preferred embodiment.

The first mesh pattern 13 has a mesh structure obtained by regularly arranging a plurality of first cells 15, 15, . . . including thin wires. The first cells 15 are in a parallelogram shape in the same size with two diagonal lines (not shown) with different lengths.

In this embodiment, each first cell 15 is in a diamond shape with four sides with the same length. Each first cell 15 is placed with its shorter diagonal line, which forms the diamond, extending along the Y-axis and the longer diagonal line extending along the X-axis.

Specifically, each first cell 15 has an acute angle A1. The first cells 15 are obtained by arranging the plurality of first thin wires 14 at a pitch d1. In FIG. 5, the illustration (a) shows the first cells 15 at an acute angle A1 of 60° and a pitch d1 of 180 μm.

As illustrated in the illustration (b) of FIG. 5, each reception electrode 12 has a second mesh pattern 16. The second mesh pattern 16 is in the shape of a mesh obtained by intersecting and arranging, at equal intervals, second thin wires 17, 17, . . . with a conductivity.

Each second thin wire 17 is a conductive layer obtained by embedding a conductive metal, such as copper or silver, in a groove in the upper surface of the substrate 4. Each second thin wire 17 has a width of 2 µm or less, for example, in one preferred embodiment.

The second mesh pattern 16 has a mesh structure obtained by regularly arranging a plurality of second cells 18, 18, . . . including thin wires. The second cells 18 are in a square shape in the same size.

Specifically, each second cell 18 is obtained by arranging the plurality of second thin wires 17 at a pitch d2. In FIG. 5, the illustration (b) shows second cells 18 at a pitch d2 of 400 µm.

Figure 6:
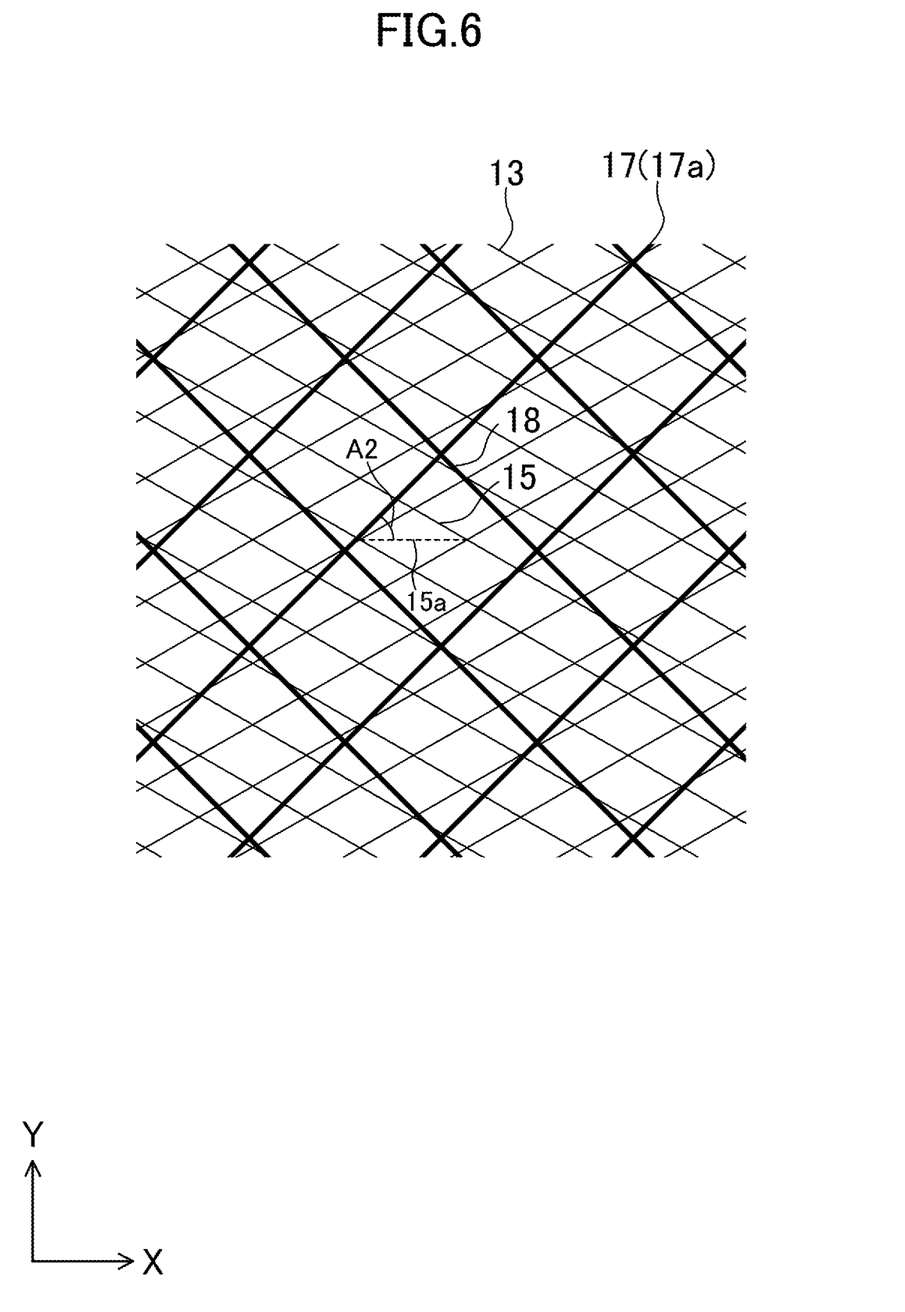
FIG. 6 is an example plan view of an overlap between the first and second mesh patterns.

FIG. 6 is a plan view of an overlap between the first and second mesh patterns 13 and 16. As illustrated in FIG. 6, each second cell 18 is placed such that one of the second thin wires 17 (e.g., a second wire 17a) and the longer diagonal line 15a of associated one of the first cells 15 form an angle A2 of 45°. The first cells 15 forming the first mesh pattern 13 and the second cells 18 forming the second mesh pattern 16 are in different shapes, which can reduce moiré and the appearance of wires. In addition, since the first and second cells 15 and 18 are in different shapes, there is no need to match the pitch d1 of the first thin wires 14 and the pitch d2 of the second thin wires 17, which can reduce the influence on the capacitance. This configuration can reduce moiré and a decrease in the touch accuracy.

In FIGS. 5 and 6, while the second thin wires 17 are represented by thicker lines than the first thin wires 14 for the sake of simplicity, the actual widths of the first and second thin wires 14 and 17 are not limited thereto. The same applies to the subsequent FIGS. 7 to 10 representing the second thin wires 17 with thicker lines than the first thin wires 14. In the illustration (a) of FIG. 5, while a dummy pattern 21, which will be described later, is represented by thicker lines than the other first thin wires 14 for the sake of simplicity, the actual widths of the dummy pattern 21 and the first thin wires 14 are not limited thereto.

(Configuration Example of Mesh Pattern)

The first and second mesh patterns 13 and 16 may satisfy the following conditions.

Figure 7:
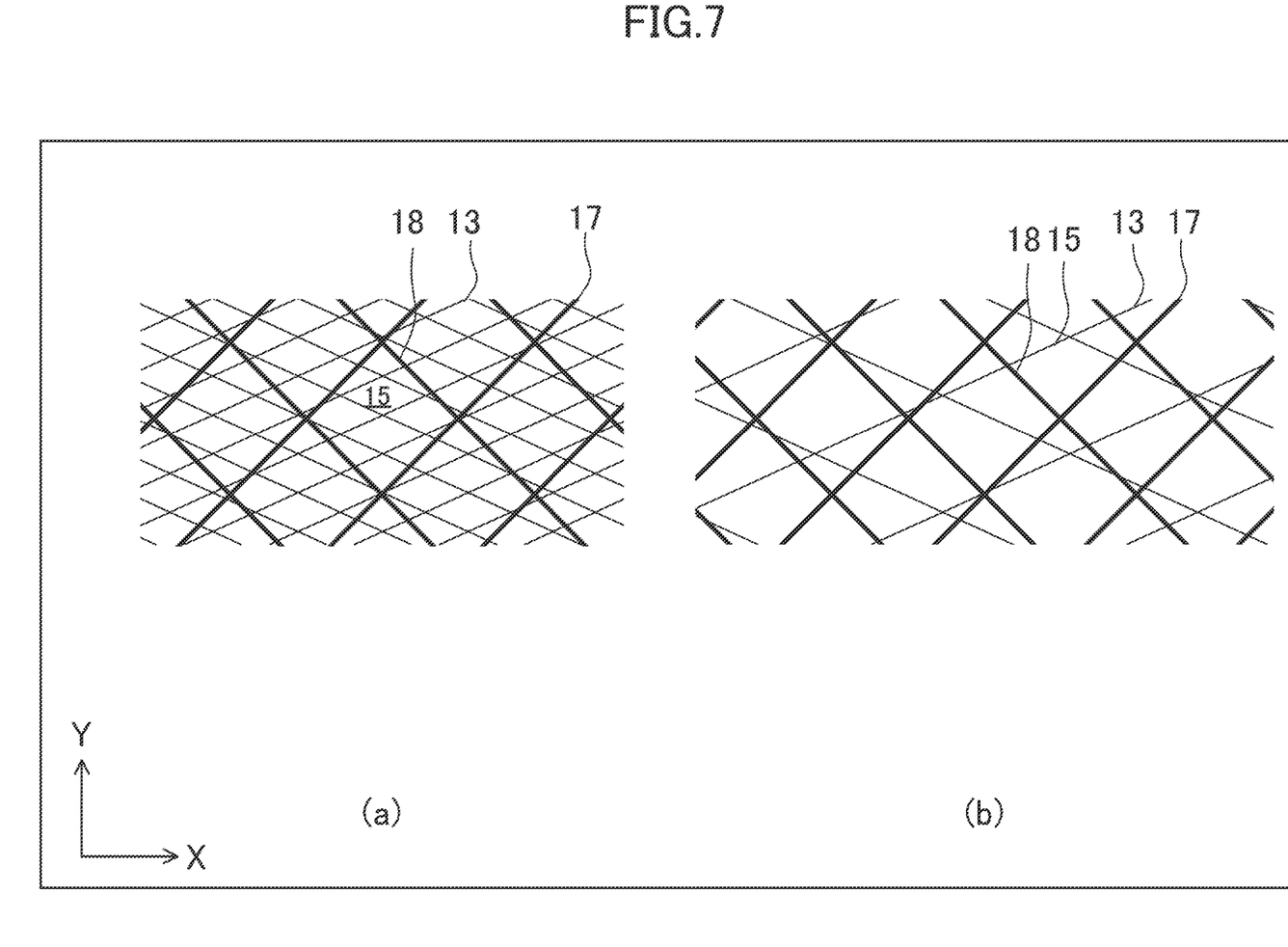
FIG. 7 is another example plan view of an overlap between the first and second mesh patterns.

FIG. 7 shows an example where the value of the pitch d1 (i.e., the interval of the plurality of first thin wires 14 in the first mesh pattern 13) is changed from that in FIG. 6. Specifically, in FIG. 7, an illustration (a) is a plan view of an overlap between the first and second mesh patterns 13 and 16 at a pitch d1 of 160 µm, a pitch d2 of 400 µm, an acute angle A1 of 60°, and an angle A2 of 45°. In FIG. 7, an illustration (b) is a plan view of an overlap between the first and second mesh patterns 13 and 16 at a pitch d1 of 160 µm, a pitch d2 of 550 µm, an acute angle A1 of 60°, and an angle A2 of 45°. The first and second mesh patterns 13 and 16 with the configurations illustrated in the illustrations (a) and (b) of FIG. 7 can reduce moiré and the appearance of wires.

Figure 8:
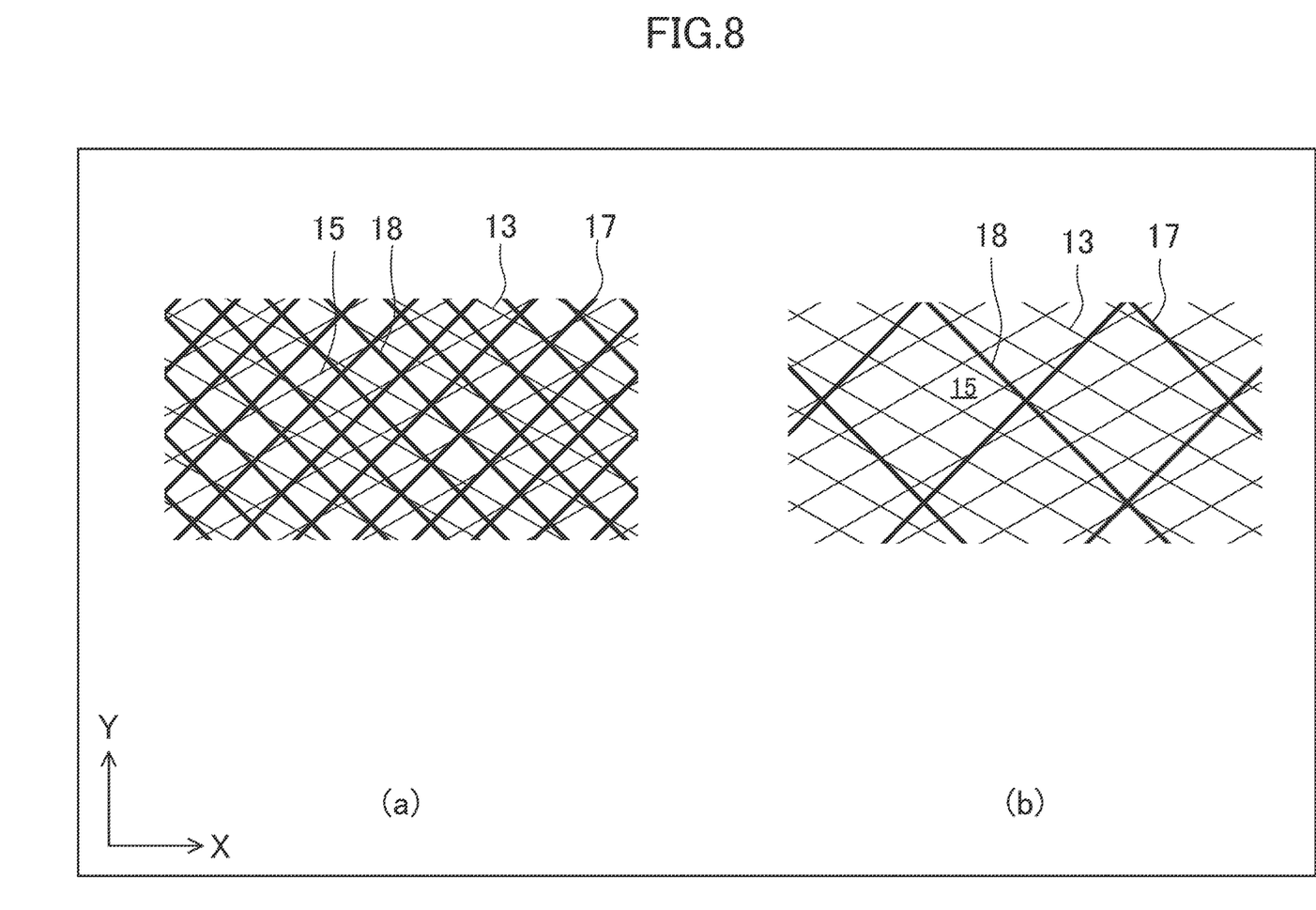
FIG. 8 is yet another example plan view of an overlap between the first and second mesh patterns.

FIG. 8 shows an example where the value of the pitch d2 (i.e., the interval of the plurality of second thin wires 17 in the second mesh pattern 16) is changed from that in FIG. 6. Specifically, in FIG. 8, an illustration (a) is a plan view of an overlap between the first and second mesh patterns 13 and 16 at a pitch d1 of 180 µm, a pitch d2 of 160 µm, an acute angle A1 of 60°, and an angle A2 of 45°. In FIG. 8, an illustration (b) is a plan view of an overlap between the first and second mesh patterns 13 and 16 at a pitch d1 of 180 µm, a pitch d2 of 550 µm, an acute angle A1 of 60°, and an angle A2 of 45°. The first and second mesh patterns 13 and 16 with the configurations illustrated in the illustrations (a) and (b) of FIG. 8 can reduce moiré and the appearance of wires.

Table 1 is for confirmation of the acute angle A1 of the first cells 15 (in a diamond shape) in the first mesh pattern 13.

TABLE 1

| | Acute Angle A1(°) | | | | |
|---|---|---|---|---|---|
| | 40 | 50 | 60 | 65 | 70 |
| Moiré | More | None | None | Less | More |

According to Table 1, at an acute angle A1 smaller than 50° or larger than 65°, moiré tends to occur. This is because when the touch sensor 1 overlaps with a display device (e.g., a liquid crystal panel) including a plurality of light-emitting pixels regularly arranged along the X- and Y-axes, the touch sensor 1 and the black matrix of the display device are likely to overlap with each other, which tends to cause moiré. On the other hand, at an acute angle A1 ranging from 50° to 65°, the touch sensor 1 and the black matrix of the display device are less likely to overlap with each other, which can reduce moiré.

Figure 9:
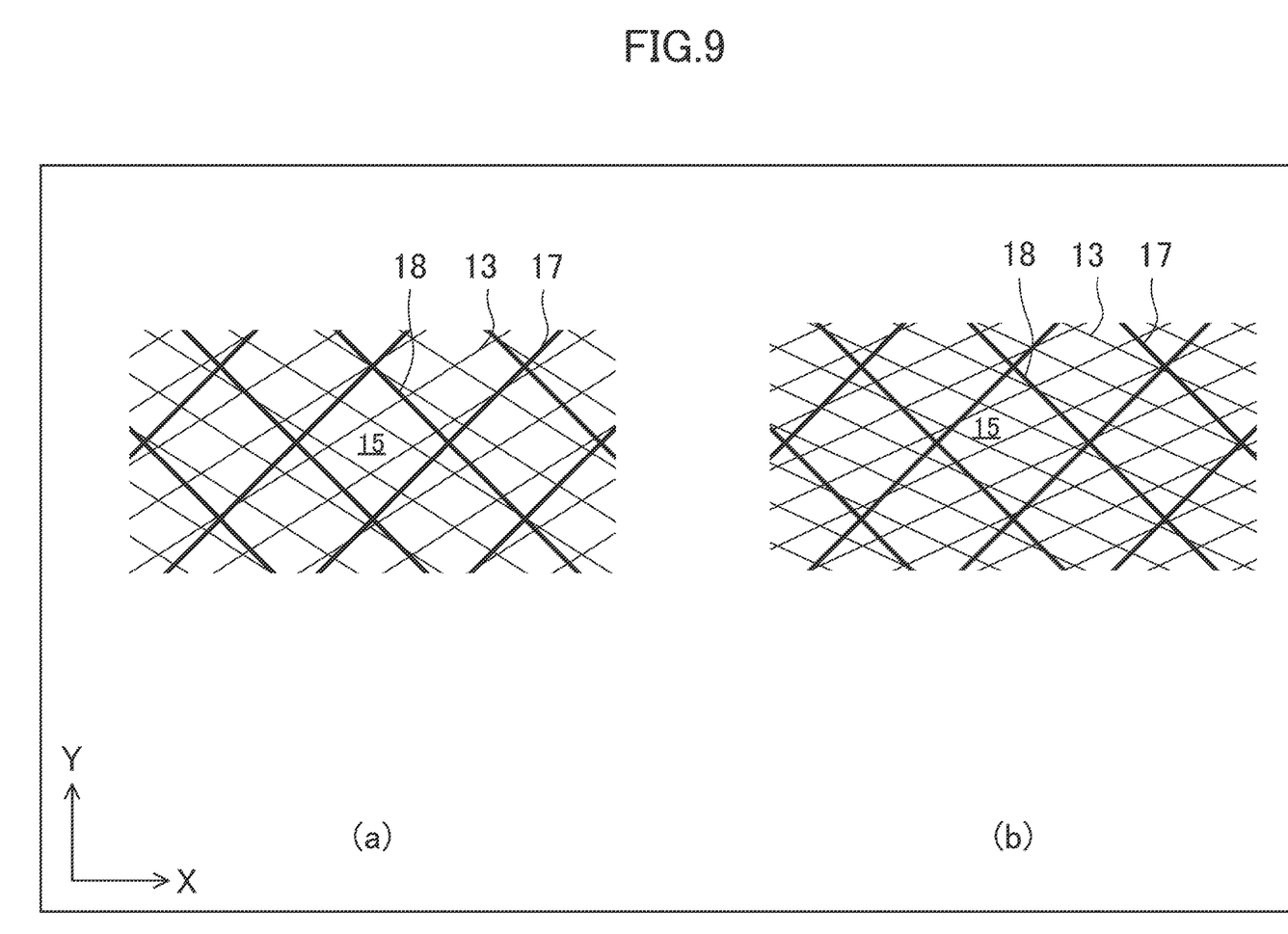
FIG. 9 is further another example plan view of an overlap between the first and second mesh patterns.

FIG. 9 shows an example where the value of the acute angle A1 is changed from that in FIG. 6. Specifically, in FIG. 9, an illustration (a) is a plan view of an overlap between the first and second mesh patterns 13 and 16 at a pitch d1 of 180 µm, a pitch d2 of 400 µm, an acute angle A1 of 65°, and an angle A2 of 45°. In FIG. 9, an illustration (b) is a plan view of an overlap between the first and second mesh patterns 13 and 16 at a pitch d1 of 180 µm, a pitch d2 of 400 µm, an acute angle A1 of 50°, and an angle A2 of 45°. As illustrated in the illustrations (a) and (b) of FIG. 9, the conditions according to Table 1 can reduce moiré.

Table 2 is for confirmation of the angle A2 formed by one of the second thin wires 17 of each second cell 18 (in a square shape) and the longer diagonal line 15a of associated one of the first cells 15 (in a diamond shape).

TABLE 2

| Angle A2(°) | 0 | 15 | 30 | 45 | 60 | 75 | 90 |
|---|---|---|---|---|---|---|---|
| Moiré | More | None | None | None | None | None | More |

According to Table 2, at an angle A2 smaller than 15° or larger than 75°, moiré tends to occur. This is because when the touch sensor 1 overlaps with a display device (e.g., a liquid crystal panel) including a plurality of light-emitting pixels regularly arranged along the X- and Y-axes, the touch sensor 1 and the black matrix of the display device are likely to overlap with each other, which tends to cause moiré. On the other hand, at an angle A2 ranging from 15° to 75°, the touch sensor 1 and the black matrix of the display device are less likely to overlap with each other, which can reduce moiré.

Figure 10:
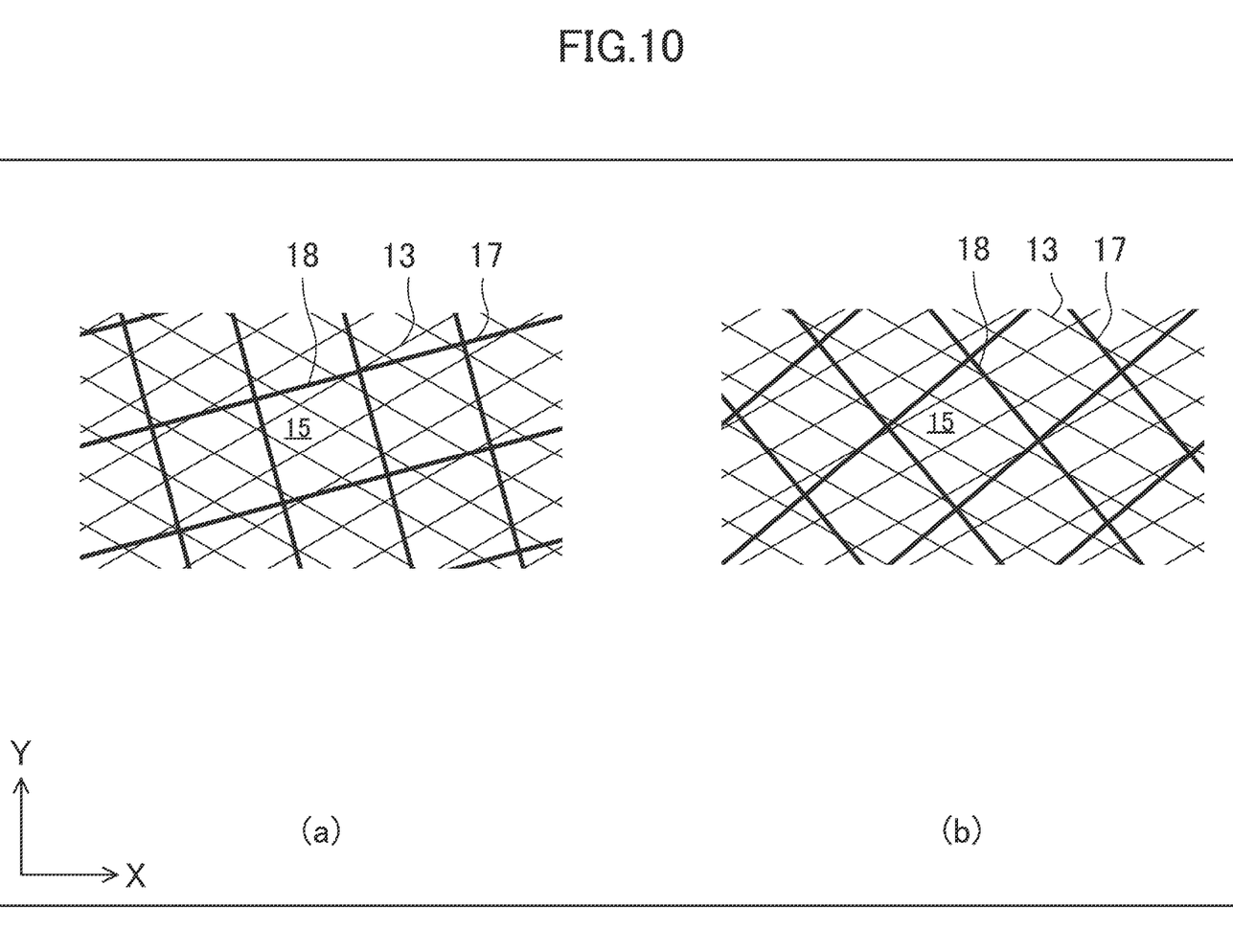
FIG. 10 is even another example plan view of an overlap between the first and second mesh patterns.

FIG. 10 shows an example where the value of the angle A2 is changed from that in FIG. 6. Specifically, in FIG. 10, an illustration (a) is a plan view of an overlap between the first and second mesh patterns 13 and 16 at a pitch d1 of 180 µm, a pitch d2 of 400 µm, an acute angle A1 of 65°, and an angle A2 of 15°. In FIG. 9, an illustration (b) is a plan view of an overlap between the first and second mesh patterns 13 and 16 at a pitch d1 of 180 µm, a pitch d2 of 400 µm, an acute angle A1 of 60°, and an angle A2 of 30°. As illustrated in the illustrations (a) and (b) of FIG. 10, the conditions according to Table 4 can reduce moiré.

Advantageous Effects of Embodiment

As described above, in the touch sensor 1, the first cells 15 in the first mesh pattern 13 and the second cells 18 in the second mesh pattern 16 are in different shapes. This configuration can reduce moiré and the appearance of wires. In addition, since the first and second cells 15 and 18 are in different shapes, there is no need to match the pitch d1 of the first thin wires 14 and the pitch d2 of the second thin wires 17, which can reduce the influence on the capacitance.

The acute angle A1 of the first cells 15 ranges from 50° to 65°. One of the second thin wires 17 of each second cell 18 and the longer diagonal line 15a of associated one of the first cells 15 form an angle A2 ranging from 15° to 75° in a plan view. Accordingly, when the touch sensor 1 overlaps with a display device (e.g., a liquid crystal panel) including a plurality of light-emitting pixels regularly arranged along the X- and Y-axes, the touch sensor 1 and the black matrix of the display device are less likely to overlap with each other, which can reduce moiré.

This configuration can reduce moiré and the appearance of wires and reduce a decrease in the touch accuracy.

The first thin wires 14 are arranged at a pitch ranging from 160 µm to 550 µm. This configuration keeps the first thin wires 14 at suitable intervals and can thus reduce moiré and the appearance of wires.

In the first embodiment, the first mesh pattern 13 may include a dummy pattern connected to none of the transmission electrodes 11. For example, in the illustration (a) of FIG. 5, the first mesh pattern 13 may include the dummy pattern 21. This dummy pattern 21 has the same pitch d1 as in the first mesh pattern 13. This configuration can narrow the intervals of the first thin wires 14, while reducing the capacitance in the first mesh pattern 13. Similarly, the second mesh pattern 16 may include a dummy pattern connected to none of the reception electrodes 12. In this case, the dummy pattern has the same pitch d2 as in the second mesh pattern 16.

As illustrated in FIGS. 5 and 6, the second cells 18 may have a larger area than the first cells 15. If the first thin wires 14 in the first mesh pattern 13 are arranged at larger intervals than the second thin wires 17 in the second mesh pattern 16, the appearance of wires is more likely to occur than in the opposite case. This is because, a wider mesh pattern is generally more conspicuous. That is, by setting the area of the second cells 18 in the second mesh pattern 16 arranged below the first mesh pattern 13 larger than the area of the first cells 15, the appearance of wires can be reduced.

As illustrated in FIGS. 5 and 6, each second cell 18 may include two or less first cells 15 in a plan view. The first cells 15 with an extremely larger area than the second cells 18 tend to cause the appearance of wires. That is, each second cell 18 including two or less first cells 15 in a plan view can reduce the appearance of wires.

While an example has been described in the first embodiment where the first cells 15 are in a diamond shape and the second cells 18 are in a square shape, the first cells 15 may be in a square shape and the second cells 18 may be in a diamond shape.

While the two substrates 4 and 4 (i.e., the first substrate 5 and the second substrate 6) are provided in the first embodiment, the configuration is not limited thereto. Specifically, only one substrate 4 (e.g., the second substrate 6) may be provided as the touch sensor 1. In such a configuration, the sensor electrodes 10, 10, the wires 20, 20, . . . and other components on the upper surface of the first substrate 5 in the above-described embodiment may be formed on the lower surface of the second substrate 6. Alternatively, the sensor electrodes 10, 10, serving as the transmission electrodes and the reception electrodes may be arranged on the same surface of one substrate 4, while being kept insulated.

Second Embodiment

Japanese Unexamined Patent Publication No. 2019-212214 discloses, in FIG. 2, a touch sensor including a plurality of thin wires with a portion irregularly bent or curved. In FIG. 2 of Japanese Unexamined Patent Publication No. 2019-212214, this portion forms a unit mesh in an irregular random shape in the touch sensor and can thus reduce a decrease in the visibility of the touch sensor.

However, in FIG. 2 of Japanese Unexamined Patent Publication No. 2019-212214, the touch sensor includes the unit mesh in the irregular random shape, which causes non-constant capacitance changes among operation points on the touch sensor. This may reduce the touch accuracy.

To address the problem, the touch sensor according to the second embodiment aims to reduce a decrease in the touch accuracy.

Figure 11:
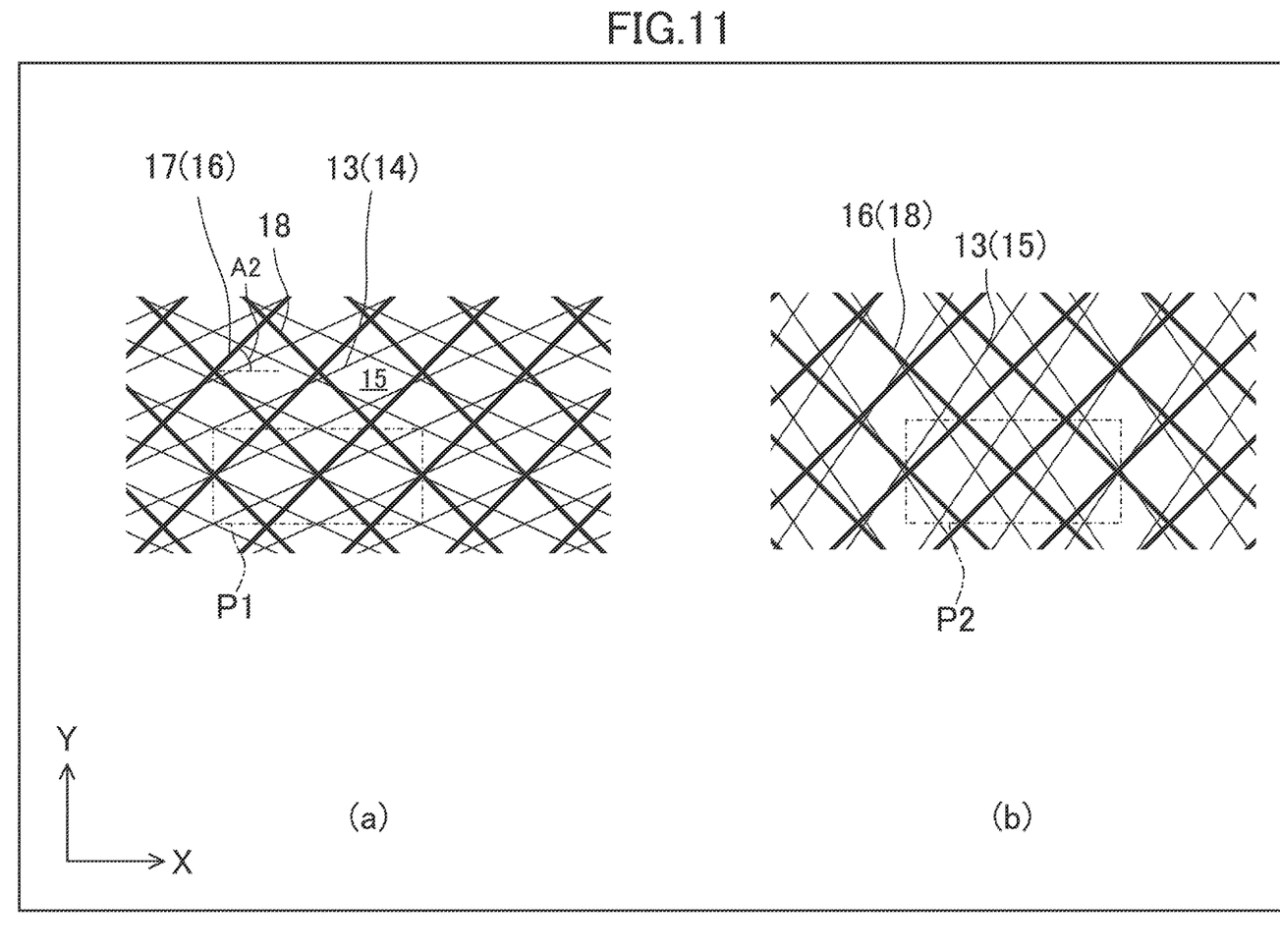
FIG. 11 is an example plan view of a touch sensor according to a second embodiment of the present disclosure where first and second mesh patterns overlap with each other.

As illustrated in an illustration (a) of FIG. 11, the first cells 15 are in a parallelogram shape in the same size with two diagonal lines with different lengths. Each first cell 15 is placed with its shorter diagonal line, which forms the diamond, extending along the Y-axis and the longer diagonal line extending along the X-axis.

The second cells 18 are in a square shape in the same size. Each second cell is formed such that one of the second thin wires 17 and the X-axis (i.e., associated one of the reception electrodes) form an angle A2 of 45°.

The first and second mesh patterns 13 and 16 have a periodic pattern in an overlap thereof (what is called a "node") in a plan view. This node serves as an area capable of generating a capacitance. For example, the first and second mesh patterns 13 and 16 may be arranged such that the pattern illustrated in the area P1 of the illustration (a) of FIG. 11 is continuously repeated along the X- and Y-axes. More specifically, in the illustration (a) of FIG. 11, the intersections between the first thin wires 14 and the intersections between the second thin wires 17 overlap each other. In addition, the overlaps between the intersections continue along the X-axis.

[Advantageous Effects of Embodiment]

As described above, the first and second mesh patterns 13 and 16 have a periodic pattern in an overlap thereof (i.e., a node) in a plan view. The arrangement of the first and second mesh patterns 13 and 16 in the periodic pattern allows an even arrangement of the first and second thin wires 14 and 17 in the overlap thereof (i.e., the node) in a plan view, which can cause a constant capacitance change in an operation of the touch sensor. This configuration can reduce a decrease in the touch accuracy.

In the second embodiment, the first and second thin wires 14 and 17 may have each a width ranging from 1 µm to 4 µm. That is, the first and second thin wires 14 and 17 have extremely small widths. The acute angle A1 of the first cells 15 may range from 50° to 70°. That is, the first cells 15 have a larger angle A1 to provide a larger angle at each intersection of the first thin wires 14. This configuration can reduce the appearance of wires.

In the second embodiment, the first mesh pattern 13 may include a dummy pattern connected to none of the transmission electrodes 11. This dummy pattern is formed by metal thin wires and is the same pattern as the first mesh pattern 13. For example, a smaller pitch d1, which is the interval of the first thin wires 14, and a smaller pitch d2, which is the interval of the second thin wires 17 can reduce the appearance of wires. However, smaller pitches d1 and d2 require a larger number of intersections between the first and second mesh patterns 13 and 16 in a plan view, which increases the capacitance and decreases the sensitivity of the touch sensor. To address the problem, by forming a dummy pattern connected to none of the transmission electrodes 11 in the first mesh pattern 13, the performance can be ensured and the metal thin wires can be included evenly, which can improve the overall appearance. Like the first mesh pattern 13, the second mesh pattern 16 may include a dummy pattern connected to none of the reception electrodes 12. In this case, the dummy pattern is the same pattern as the second mesh pattern 16. Note that only the first mesh pattern 13 may include a dummy pattern and the second mesh pattern 16 may include no dummy pattern.

The pitch d1 of the first thin wires 14 and the pitch d2 of the second thin wires 17 may each range from 70 μm to 400 μm. The pitches causes less appearance of wires, while keeping an aperture ratio. This configuration can reduce moiré and the appearance of wires. The aperture ratio is represented by $(P-w)^2/P^2$, where w is the wire width of the sensor electrodes 10 and P is the interval of the sensor electrodes 10.

While an example has been described in the second embodiment where the area P1 illustrated in the illustration (a) of FIG. 11 as the periodic pattern of the first and second mesh patterns 13 and 16 in an overlap thereof in a plan view, the configuration is not limited thereto. For example, the first and second mesh patterns 13 and 16 may be arranged such that the pattern illustrated in an area P2 of an illustration (b) of FIG. 11 is continuously repeated along the X- and Y-axes. That is, the first and second mesh patterns 13 and 16 only need to be in a periodic pattern in an overlap thereof in a plan view. The periodic pattern may be any pattern.

While the embodiments of the present disclosure have been described above, the present disclosure is not limited to the embodiments, and various modifications can be made within the scope of the invention.

INDUSTRIAL APPLICABILITY

The present disclosure is industrially applicable as a touch sensor input device allowing a touch operation.

DESCRIPTION OF REFERENCE CHARACTERS

1 Touch Sensor
10 Sensor Electrode
11 Transmission Electrode (First Electrode)
12 Reception Electrode (Second Electrode)
13 First Mesh Pattern
14 First Thin Wire
15 First Cell
16 Second Mesh Pattern
17 Second Thin Wire
18 Second Cell
21 Dummy Pattern
A1 Acute Angle
A2 Angle

The invention claimed is:

1. A touch sensor comprising:
a first electrode in a first mesh pattern obtained by intersecting a plurality of first thin wires with a conductivity; and
a second electrode in a second mesh pattern obtained by intersecting a plurality of second thin wires with a conductivity,
the first mesh pattern being formed by first cells in a diamond shape with an acute angle,
the second mesh pattern being formed by second cells in a square shape,
the acute angle ranging from 50° to 65°,
one of the second thin wires of each of the second cells and a longer diagonal line of associated one of the first cells forming an angle ranging from 15° to 75° in a plan view,
wherein the touch sensor further includes an operation screen defining a surface to be touched by a detection target,
the first mesh pattern is arranged closer to the operation screen than the second mesh pattern in a thickness direction, and
an area of each of the second cells is larger than an area of each of the first cells.

2. The touch sensor of claim 1, wherein
the first thin wires are arranged at a pitch ranging from 160 μm to 550 μm.

3. The touch sensor of claim 1, wherein
the first mesh pattern includes a dummy pattern not connected to the first electrode.

4. The touch sensor of claim 1, wherein
each of the second cells includes two or less of the first cells in a plan view.

5. The touch sensor of claim 1, wherein
the first mesh pattern and the second mesh pattern have a periodic pattern in an overlap thereof in a plan view.

6. The touch sensor of claim 5, wherein
each of the first and second thin wires has a width ranging from 1 μm to 4 μm.

7. The touch sensor of claim 5, wherein
the first mesh pattern includes a dummy pattern not connected to the first electrode.

8. The touch sensor of claim 7, wherein
the second mesh pattern includes a dummy pattern not connected to the second electrode.

9. The touch sensor of claim 5, wherein
the first thin wires are arranged at a pitch ranging from 70 μm to 400 μm, and
the second thin wires are arranged at a pitch ranging from 70 μm to 400 μm.

10. A touch sensor comprising:
a first electrode in a first mesh pattern obtained by intersecting a plurality of first thin wires with a conductivity; and
a second electrode in a second mesh pattern obtained by intersecting a plurality of second thin wires with a conductivity,
the first mesh pattern being formed by first cells in a diamond shape with an acute angle,
the second mesh pattern being formed by second cells in a square shape,
the acute angle ranging from 50° to 65°,
one of the second thin wires of each of the second cells and a longer diagonal line of associated one of the first cells forming an angle ranging from 15° to 75° in a plan view,
wherein the first mesh pattern and the second mesh pattern have a periodic pattern in an overlap thereof in a plan view,
the first mesh pattern includes a dummy pattern not connected to the first electrode, and
the second mesh pattern includes a dummy pattern not connected to the second electrode.

11. The touch sensor of claim 10, wherein
the first thin wires are arranged at a pitch ranging from 160 μm to 550 μm.

12. The touch sensor of claim 10, wherein
an area of each of the second cells is larger than an area of each of the first cells.

13. The touch sensor of claim 10, wherein
each of the second cells includes two or less of the first cells in a plan view.

14. The touch sensor of claim 10, wherein
each of the first and second thin wires has a width ranging from 1 μm to 4 μm.

15. The touch sensor of claim 10, wherein
the first thin wires are arranged at a pitch ranging from 70 μm to 400 μm, and
the second thin wires are arranged at a pitch ranging from 70 μm to 400 μm.

* * * * *